(12) United States Patent
T et al.

(10) Patent No.: US 11,161,326 B2
(45) Date of Patent: Nov. 2, 2021

(54) AUTOMOTIVE GLAZING SYSTEM WITH A DISPLAY

(71) Applicant: SAINT-GOBAIN GLASS FRANCE, Courbevoie (FR)

(72) Inventors: Arunvel T, Chennai (IN); Jyothi Latha Tamalapakula, Chennai (IN); Robin C Jayaram, Chennai (IN); Monisha Dhanabal, Chennai (IN); Samson Richardson D, Chennai (IN)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/490,399

(22) PCT Filed: Mar. 6, 2018

(86) PCT No.: PCT/IN2018/050125
§ 371 (c)(1),
(2) Date: Aug. 30, 2019

(87) PCT Pub. No.: WO2018/163208
PCT Pub. Date: Sep. 13, 2018

(65) Prior Publication Data
US 2019/0385511 A1    Dec. 19, 2019

(30) Foreign Application Priority Data

Mar. 7, 2017  (IN) .............................. 201741007887

(51) Int. Cl.
*G09G 3/30* (2006.01)
*B32B 17/10* (2006.01)
(Continued)

(52) U.S. Cl.
CPC .... *B32B 17/10036* (2013.01); *B32B 17/1077* (2013.01); *B32B 17/10211* (2013.01);
(Continued)

(58) Field of Classification Search
CPC ................ G09G 3/30; B32B 17/10036; B32B 17/10211
(Continued)

(56) References Cited

U.S. PATENT DOCUMENTS 8,289,274 B2 * 10/2012 Sliwa ..................... G03B 25/00
345/108
9,140,458 B2 * 9/2015 Hoffmann ............... F24C 3/124
(Continued)

OTHER PUBLICATIONS

International Search Report in PCT/IN2018/050125, dated Apr. 27, 2018.
Written Opinion in PCT/IN2018/050125, dated Apr. 27, 2018.

*Primary Examiner* — Calvin C Ma
(74) *Attorney, Agent, or Firm* — McDonnell Boehnen Hulbert & Berghoff LLP

(57) ABSTRACT

A laminated curved article [102] comprising a first substrate [102a] consisting an outer face and a ceramic masked [104] inner face along the periphery, one or more interlayers [102c] disposed on the inner face of the first substrate [102a], a second substrate [102b] disposed on the interlayer [102c] and one or more electroluminescent devices [116] connected to connector element [126] and provided in the ceramic masked [104] inner face of the first substrate [102a] and the second substrate [102b]. The one or more electroluminescent devices [116] comprising a dielectric layer [116a] disposed on a luminescence layer [116b], wherein both the dielectric layer [116a] and luminescence layer [116b] are sandwiched together by a multilayer consisting of a conductive layer [116c], an insulating layer [116d] and a protective layer [116e].

28 Claims, 7 Drawing Sheets

(51) Int. Cl.
B32B 27/08 (2006.01)
B32B 27/30 (2006.01)
B32B 27/32 (2006.01)
B32B 27/36 (2006.01)
B32B 27/40 (2006.01)
B32B 37/18 (2006.01)
B32B 38/00 (2006.01)
B60J 1/00 (2006.01)
B60J 1/02 (2006.01)
B60K 35/00 (2006.01)

(52) U.S. Cl.
CPC .. *B32B 17/10348* (2013.01); *B32B 17/10467* (2013.01); *B32B 17/10541* (2013.01); *B32B 17/10743* (2013.01); *B32B 17/10761* (2013.01); *B32B 17/10788* (2013.01); *B32B 17/10889* (2013.01); *B32B 17/10935* (2013.01); *B32B 17/10972* (2013.01); *B32B 27/08* (2013.01); *B32B 27/30* (2013.01); *B32B 27/306* (2013.01); *B32B 27/308* (2013.01); *B32B 27/32* (2013.01); *B32B 27/365* (2013.01); *B32B 27/40* (2013.01); *B32B 37/182* (2013.01); *B32B 37/185* (2013.01); *B32B 38/0012* (2013.01); *B60J 1/001* (2013.01); *B60J 1/02* (2013.01); *G09G 3/30* (2013.01); *B32B 2307/412* (2013.01); *B32B 2307/422* (2013.01); *B32B 2315/08* (2013.01); *B32B 2323/10* (2013.01); *B32B 2329/06* (2013.01); *B32B 2331/04* (2013.01); *B32B 2333/08* (2013.01); *B32B 2369/00* (2013.01); *B32B 2375/00* (2013.01); *B32B 2605/006* (2013.01); *B32B 2605/08* (2013.01); *B60K 35/00* (2013.01); *G09G 2380/10* (2013.01)

(58) Field of Classification Search
USPC ........................................... 345/7, 87
See application file for complete search history.

(56) References Cited

U.S. PATENT DOCUMENTS

| | | |
|---|---|---|
| 9,403,477 B2 | 8/2016 | Richard et al. |
| 9,846,265 B2 | 12/2017 | Ehrensperger et al. |
| 2014/0240998 A1* | 8/2014 | Richard ................. B60Q 1/268 |
| | | 362/510 |
| 2015/0192707 A1 | 7/2015 | Ehrensperger et al. |
| 2017/0015180 A1* | 1/2017 | Sakamoto ................. B60J 1/02 |
| 2018/0200983 A1* | 7/2018 | Nakagawa ............. B60R 11/02 |
| 2018/0268701 A1* | 9/2018 | Sato ....................... G08G 1/166 |

* cited by examiner

AUTOMOTIVE GLAZING SYSTEM WITH A DISPLAY

CROSS-REFERENCE TO RELATED APPLICATIONS

This application is a U.S. National Stage application of International Patent Application PCT/IN2018/050125, filed Mar. 6, 2018, which claims the benefit of priority of Indian Patent Application no. 201741007887, filed Mar. 7, 2017.

TECHNICAL FIELD

The present disclosure relates generally to a laminated glass for windshield of a vehicle and in particularly, to a display on the laminated glass for windshield of a vehicle.

BACKGROUND

Background description includes information that may be useful in understanding the present disclosure. It is not an admission that any of the information provided herein is prior art or relevant to the presently claimed invention, or that any publication specifically or implicitly referenced is prior art.

Automotive laminated glass or windshield comprising two sheets of rigid material such as glass sheet is already known. The glass sheets are connected together by a thermoplastic interlayer sheet usually comprising of polyvinyl butyral (PVB). Automotive laminated glass means windscreens, rear windows, side windows, opening and non-opening roofs, rear-view mirrors or protective glass for headlamps.

Automotive laminated glass is particularly designed to provide the driver a view of the forward region of the vehicle during driving and rearward region of the vehicle during reversing and other maneuvers. More recently, automobile laminated glass has shown a trend to incorporate completely new functions, such as insertion of light-emitting diodes (LEDs) into laminated glass for lighting units, indicator lights etc. Generally, the insertion of light-emitting diodes (LEDs) into automotive laminated glass allows indicator light display intended for the driver of the vehicle or the passengers or for aesthetic of the vehicle or for internal lighting. However, LEDs are sensitive to both temperature and humidity and the nature of its local environment adversely affects the performance.

A laminated glazing, which incorporates an electrical device, especially in the form of an electroluminescent device, is desirable due to longer operational lifetime than a conventional incandescent bulb or LED. The electroluminescent device display is brighter than LEDs and provides a similar surface brightness at all angles. The electroluminescent device display is monochromatic, narrow bandwidth and one can see the same from long distances. Further, the power consumption of electroluminescent device is very low and hence is an ideal solution to save power of the battery devices. The laminated glazing, which incorporates electroluminescent device, is also able to withstand elevated temperature and humidity. Additionally, the light provided by an electroluminescent device is often more diffusing than that from an incandescent bulb or LED, and provides more aesthetically pleasing lighting effect. WO2007122426 provides one example of such automobile glazing. It discloses a laminated glazing, in the form of a roof window comprising an electrical device in the form of an electroluminescent lamp integrated in the laminate construction. Further, US20160159282 provides a plurality of rectangular organic electroluminescent displays laminated in the laminated glass. However, the electroluminescent device integrated in the laminated glazing as mentioned in the above prior arts is only for lighting and/or aesthetic purpose. In addition, the above-mentioned prior arts also fail to disclose the details of electroluminescent device. A typical electroluminescent device comprises a luminescence layer that is interleaved between two conducting layers. However, using such normal electroluminescent device have one major safety related disadvantage. Whenever there is an external impact on the laminated glazing, which is integrated with an electroluminescent device the glazing can get damaged and can shatter into sharp pieces of fine glass and also might electrocute the driver and passengers, thereby increasing the possibility of injury caused to both the driver and passengers. Such external impact may happen due to foreign objects such as a small stone, a hailstones or a windborne debris.

Hence, it would be desirable to provide a laminated glazing integrated with electroluminescent device for displaying information of interest in addition to perform the usual function of viewing the road by the driver, passenger or others as well. In addition, it is necessary to propose a vehicular display system on the automotive glazing for ease of viewing the desired information. Moreover, there is a need for an improved aesthetically pleasing automotive glazing integrated with electroluminescent layer with less processing steps. Further, there is a need to provide a laminated glazing integrated with electroluminescent device which is more safe for both the driver and the passenger in case of any cracking or chipping of the laminated glazing.

SUMMARY OF THE DISCLOSURE

One aspect of the present disclosure provides a laminated curved article comprising a first substrate consisting an outer face and a ceramic masked inner face along the periphery, one or more interlayers disposed on the inner face of the first substrate, a second substrate disposed on the interlayer and one or more electroluminescent devices connected to connector element and provided in the ceramic masked inner face of the first substrate and the second substrate. The one or more electroluminescent devices comprising a dielectric layer disposed on a luminescent layer, wherein both the dielectric layer and luminescence layer are sandwiched together by a multilayer consisting of a conductive layer, an insulating layer and a protective layer.

Another aspect of the present disclosure is to provide a display system for a vehicle comprising of one or more sensors to detect one or more conditions. The laminated curved article integrated with one or more electroluminescent devices to display one or more conditions detected by one or more sensors. The electronic circuitry connected to one or more electroluminescent devices through one or more connector elements to generate, capture and transmit signals of one or more conditions.

Another aspect of the present disclosure is to provide a method of manufacturing laminated curved article comprising firstly bending first and second substrate to a curved shape. Secondly, assembling the curved first and second substrate to one or more interlayers and one or more electroluminescent devices attached with connector element to form an assembly. Thirdly, de-airing the assembly to form a de-aired assembly. Finally, autoclaving the de-aired assembly to form the electroluminescent integrated laminated curved article.

Other features and aspects of this disclosure will be apparent from the following description and the accompanying drawings.

BRIEF DESCRIPTION OF THE DRAWINGS

Embodiments are illustrated by way of example and are not limited in the accompanying figures.

Figure 1:
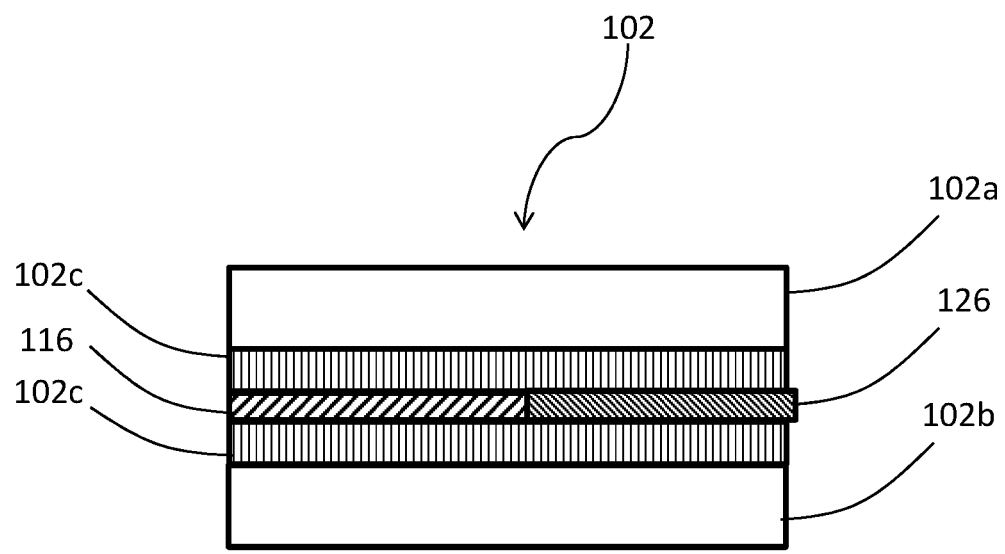
FIG. 1 illustrates a cross section view of a laminated curved article; according to an embodiment of the present disclosure.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the disclosure.

DETAILED DESCRIPTION

The present disclosure is now discussed in more detail referring to the drawings that accompany the present application. In the accompanying drawings, like and/or corresponding elements are referred to by like reference numbers. Wherever possible, the same reference numbers will be used throughout the drawings to refer to the same or the like parts. The present disclosure is to provide an improved laminated glass for windshield of a vehicle incorporating other functions in addition to the usual one. The present disclosure further provides simple and low cost manufacturing and construction method of an improved laminated glass for windshield of a vehicle with new functions. Further, the present disclosure relates to laminated glass for windshield of a vehicle as an anchor for lighting device for display contained within the laminate.

FIG. 1 is a cross section view of a laminated curved article 102. A laminated curved article 102 comprises a first substrate 102*a* consisting an outer face and a ceramic masked 104 (not shown) inner face, one or more interlayers 102*c* disposed on the inner face of the first substrate 102*a*, a second substrate 102*b* disposed on the interlayer 102*c* and an electroluminescent device 116 connected to connector element 126 and provided in the ceramic masked 104 inner face of the first substrate 102*a*. The inner face of the first substrate 102*a* is masked with ceramic 104 (not shown) only along the periphery. The laminated curved article 102 describe herein may be utilized in vehicles such as automobiles for glazing such as windshields, windows or sidelites, mirrors. The electroluminescent device 116 is disposed between the two interlayers 102*c*. The electroluminescent device 116 is placed in the ceramic masked inner face 104 (not shown) of the first substrate 102*a* to eliminate any degradation in performance due to exposure of UV.

In an embodiment, the first substrate 102*a*, the second substrate 102*b* or both the first and the second substrate 102*a*, 102*b* may be of glass or polymer. The polymer is polycarbonate (PC) or polypropylene (PP). Optionally, at least the first substrate 102*a*, the second substrate 102*b* or both the first and the second substrate 102*a*, 102*b* may be strengthened either chemically or thermally. The first substrate 102*a*, the second substrate 102*b* or both the first and the second substrate 102*a*, 102*b* may have a thickness of at least 0.5 mm.

In an embodiment, one or more interlayer 102*c* include a polymer. The interlayers 102*c* comprises a polymer selected from the group consisting of poly vinyl butyral (PVB), polycarbonate, acoustic PVB, ethylene vinyl acetate (EVA), thermoplastic polyurethane (TPU), ionomer, a thermoplastic material, and combinations thereof. The interlayer may have a thickness of at least 0.38 mm. Optionally, the interlayers 102*c* is modified to accommodate one or more electroluminescent devices 116. Generally, the interlayer 102*c* is modified to assemble thicker electroluminescent device 116 in the laminated curved article 102. In some instances, the interlayer 102*c* is modified to accommodate two electroluminescent devices 116 placed on top of each other to display on both the sides of the laminated curved article 102. The interlayer 102*c* is modified by either cutting, pressing, grinding, heating or combination thereof. The cutting of interlayer 102*c* is done manually or automatically by means of cutting fixtures. The grinding of interlayer 102*c* is done by means of abrasive wheel or pencil grinders which are electrically or pneumatically operated. Further, the interlayer 102*c* can be modified by heating. In this, the electroluminescent device 116 is disposed on the interlayer 102*c* by means of a hot stamping tool in which stamping is done by means of physical pressure and at a defined temperature. In some instances, the modification of interlayer 102*c* by heating method is also done by means of having an adhesive backing in electroluminescent device 116 along with hot stamping to ensure much higher bonding between interlayer 102*c* and the electroluminescent layer 116.

In an embodiment, the electroluminescent device 116 is disposed between the first substrate 102*a* and the second substrate 102*b*, or integral to one or both the first substrate 102*a* and the second substrate 102*b*, or disposed between one or more interlayers 102*c*, or integral to one or more interlayers 102*c*. FIG. 1 illustrates an electroluminescent device 116 sandwiched between the two interlayers 102*c*. The electroluminescent device 116 is either optically transparent, opaque or translucent. The electroluminescent device 116 comprises a material selected from the group consisting of organic or inorganic material. The electroluminescent devices 116 has the luminescence value of at least 1 Cd/m². The electroluminescent device 116 is integrated in the laminated curved article 102 by printing, depositing or patching. The electroluminescent device 116 can be directly printed onto the first or second substrate 102*a*, 102*b* or the interlayer by means of screen printing with multiple layer onto one another. The electroluminescent device 116 can also be deposited over the first or second substrate 102*a*, 102*b* directly either by physical vapor deposition coating or chemical vapor deposition coating. In some instances, the electroluminescent device 116 can be a separate thin film patch which can be fixed by adhesive either on first or second substrate 102a, 102b or on the interlayer 102c. The electroluminescent device 116 has a thickness of at least 5% of interlayer 102c thickness. The electroluminescent device 116 has a thickness of at least 50 μm to 500 μm. The one or more electroluminescent device 116 can be of different colors.

The laminated curved article 102 can be prepared in various combinations depending on the required thickness and application. In an embodiment, one or more interlayers 102c can be either on both sides of the electroluminescent device 116 as shown in FIG. 1 or one single interlayer 102c on single side of electroluminescent device 116.

In an embodiment, the connector element 126 is sandwiched between two shielding layers. The shielding layer is made of a flexible polymer. The shielding layer comprises a material selected from the group consisting of ethylene propylene rubber, polyimide and/or cross-linked polyethylene. The shielding layer is provided for maintaining the electrical, thermal and mechanical integrity of connector element 126 in case of any external impact on the laminated curved article 102 like stone impact, crashes or bumps. The connector element 126 is either completely or partially embedded in the laminated curved article 102. The connector element 126 is integrated by printing, depositing or patching. The connector element 126 can be directly printed onto the first or second substrate 102a, 102b or the interlayer by means of screen printing with multiple layer onto one another. The connector element 126 can also be deposited over the first or second substrate 102a, 102b directly either by physical vapor deposition coating or chemical vapor deposition coating. The connector element 126 can be a separate thin film patch which is can be fixed by adhesive either on first or second substrate 102a, 102b or on the interlayer 102c.

Figure 2:
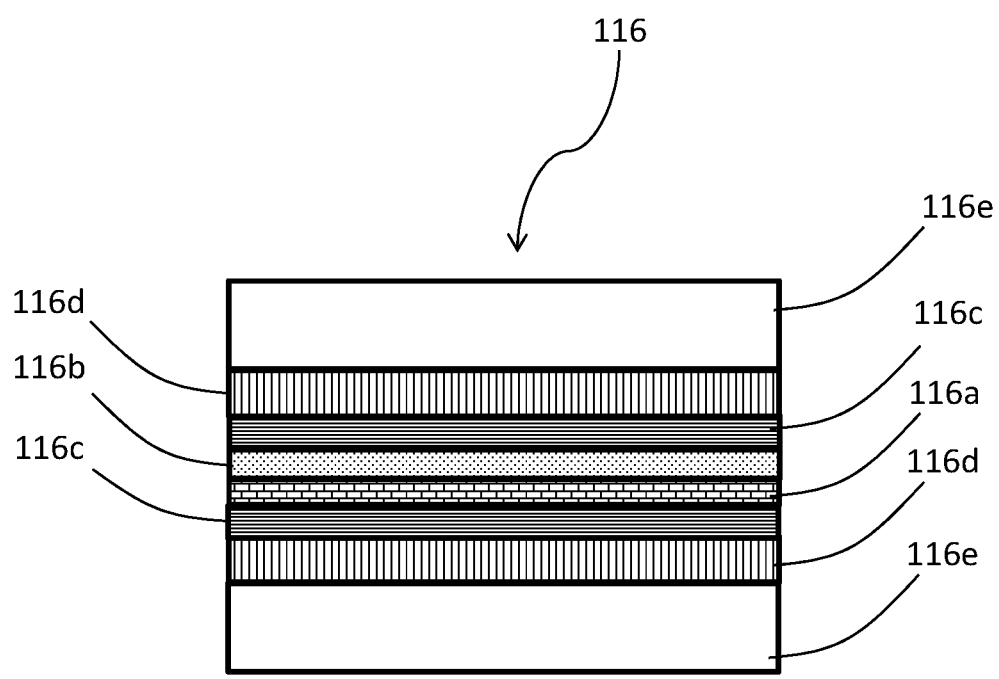
FIG. 2 illustrates a cross section view of an electroluminescent device; according to an embodiment of the present disclosure.

FIG. 2 is a cross section view of an electroluminescent device 116. The electroluminescent device 116 comprising a dielectric layer 116a disposed on a luminescence layer 116b. The dielectric layer 116a and luminescence layer 116b are sandwiched together by a multilayer consisting of a conductive layer 116c, an insulating layer 116d and a protective layer 116e.

Figure 3:
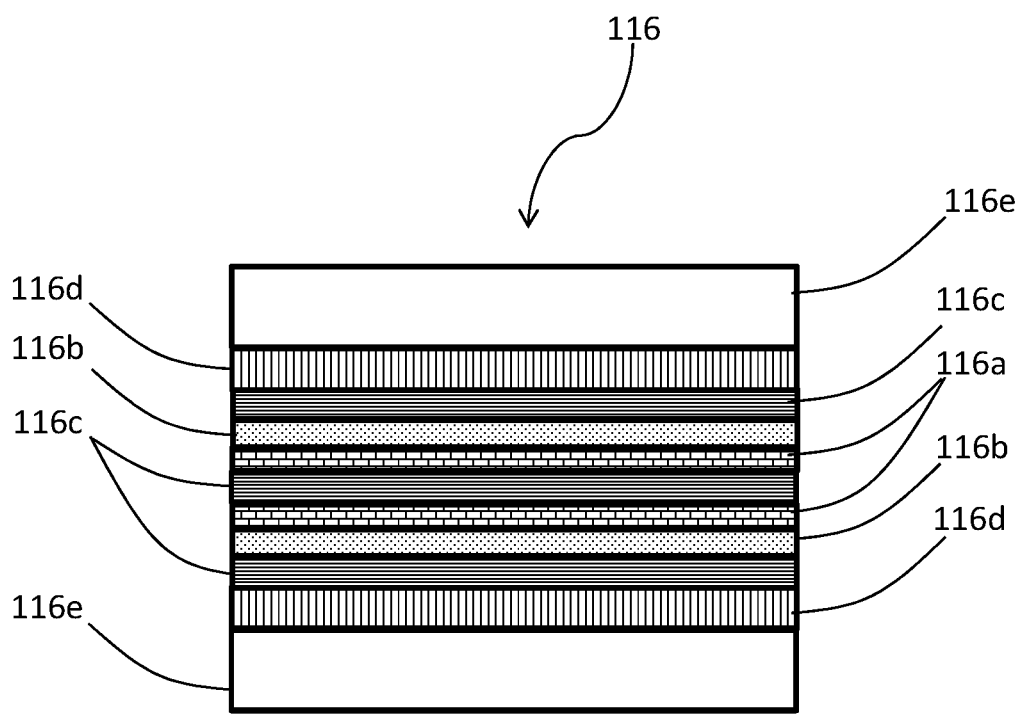
FIG. 3 illustrates a cross section view of an alternative electroluminescent device; according to an embodiment of the present disclosure.

FIG. 3 is an alternative cross section view of an electroluminescent device 116 which is employed when display is required on both sides of the laminated curve article 102 (not shown).

In an embodiment, the protective layer 116e and insulating layer 116d comprises a material selected from the group consisting of polyethylene terephthalate (PET), polyester, polyimide, epoxy resin or polyethylene naphthalate (PEN). The protective layer 116e and insulating layer 116d is provided for maintaining the electrical and mechanical integrity of the other functional layers such as conductive layer 116c, dielectric layer 116a and luminescence layer 116b in case of any external impact on the laminated curved article 102 like stone impact, crashes or bumps.

In some instances, there can be more than one protective layer 116e and/or insulating layer 116d. The number of layers are selected based on the amount of insulation necessary for maintaining the electrical and mechanical integrity of the other functional layers such as conductive layer 116c, dielectric layer 116a and luminescence layer 116b.

In an embodiment, the conductive layer 116c comprises a material selected from the group consisting of metal, conductive polymers, metal grids, carbon nanotubes (CNT) layer, graphene, transparent conductive oxides or conductive oxides. The metal is selected from the group consisting of copper, aluminum, silver or platinum. The transparent conductive oxides are selected from the group consisting of zinc oxide or indium tin oxide. The conductive polymers are selected from the group consisting of polyaniline or polyindoles. In some instances, at least one conductive layer 116c is substantially transparent.

In an embodiment, the dielectric layer 116a comprises a material selected from the group consisting of silicon dioxide, barium titanate, lead titanate or tin dioxide.

In an embodiment, the luminescence layer 116b comprises a material selected from the group consisting of phosphor, zinc sulphide or cadmium sulphide.

Further, optionally the conductive layer 116c, dielectric layer 116a and/or luminescence layer 116b is doped. The doping helps in enhancing the required electrical properties of the layers such as improved conduction, improved charge transfers and optimize dielectric strength.

In an embodiment, optionally a reflective layer is disposed on one or more electroluminescent devices 116. The reflective layer is utilized to improve the optical properties of the electroluminescent devices 116. The reflective layer improves the illuminescence and control the direction of lighting from the electroluminescent device 116. The reflective layer comprise reflector grains made of glass micro spheres or a circumferential layer with high reflectance attained by silver/metallic coating. Further, in some instances adhesion promoter layer may also be disposed on electroluminescent device 116. The adhesion promoter layer is used to enhance mechanical integrity electroluminescent device 116 integrated in the laminated curved article 102. This helps in preventing delamination of the electroluminescent device 116 in the laminated curved article 102 and increase the adhesion with the first substrate 102a, second substrate 102b or the interlayer 102c.

Figure 4:
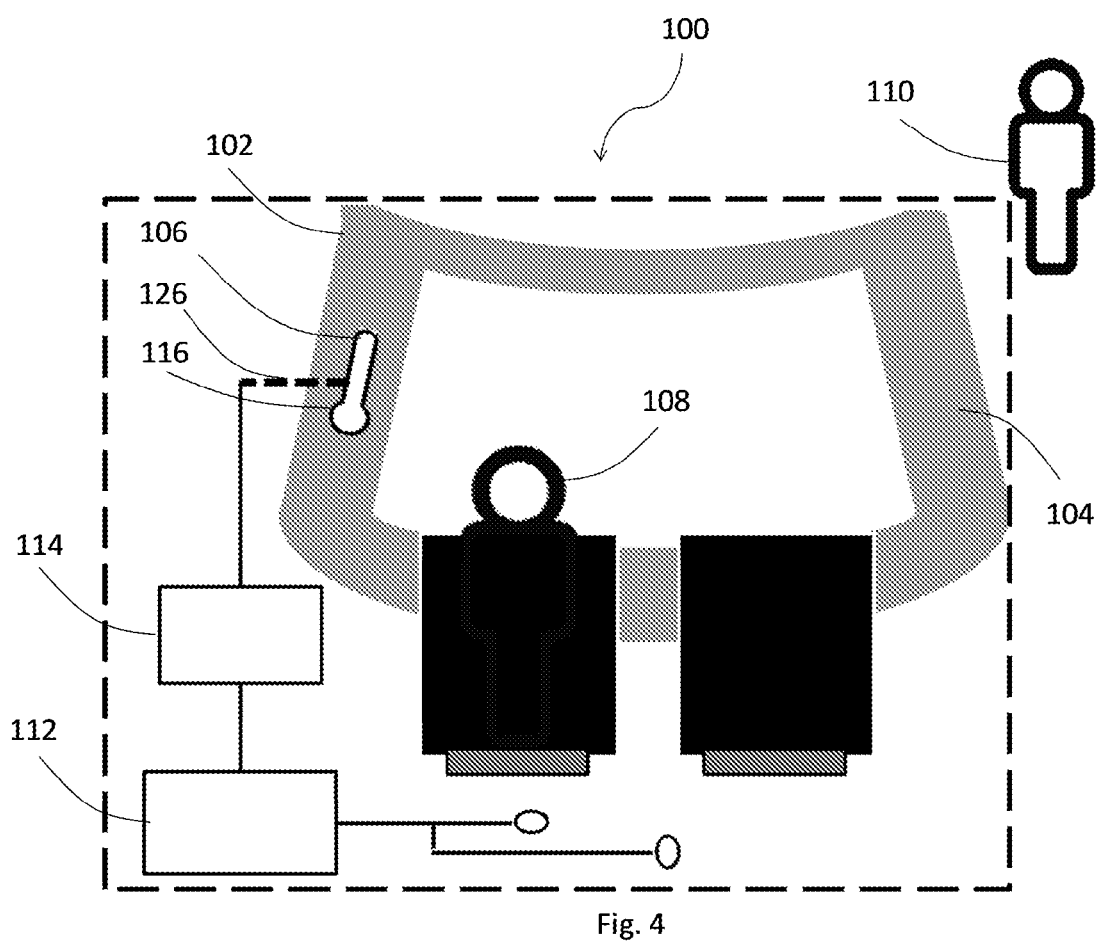
FIG. 4 illustrates a general scheme of a display system for a vehicle and its operation in accordance with the concept of the present disclosure.

FIG. 4 illustrates an improved display system 100 for a vehicle herein, which is intended to perform its usual function of viewing the road by the driver and, additionally, incorporates new functions designed for displaying one or more conditions of interest for the driver of the vehicle or the passenger such as: environment-related parameters, such as: temperature, relative air humidity, air quality and others; functions relating to the use of the vehicle, such as: taximeter, location and others; driver-related functions, such as: breath alcohol analyzer (alcohol testing device), sleepiness sensor and others.

For such purpose, the display system 100 essentially comprising of sensor 112, electroluminescent device 116 integrated in the laminated curved article 102 and electronic circuitry 114. The sensor 112 detects or sense one or more conditions. The sensor 112 is mounted on suitable parts and/or mechanisms of the vehicle. The sensor 112 are mounted on the exterior or interior of the vehicle. The sensor 112 are designed to be responsive to the environmental conditions or stimuli outside the vehicle are mounted on the exterior suitable parts of the vehicle and those responsive to stimuli inside the vehicle, such as taximeter, are mounted in the usual interior suitable parts of the vehicle. The sensor 112 intended to be actuated by the environmental conditions or stimuli outside the vehicle are mounted on the exterior suitable parts of the vehicle and those actuated by stimuli inside the vehicle are mounted interior suitable parts of the vehicle or others.

In an embodiment, electroluminescent device 116 integrated in the laminated curved article 102 to display condition detected by sensor 112. The electroluminescent device 116 is disposed behind the ceramic masked 104 inner face of the first substrate 102a (not shown) of the laminated curved article 102. The ceramic masking 104 is applied in the inner face of the first substrate 102a (not shown) of the laminated curved article 102 in a predetermined pattern, design or other representation 106. The electroluminescent device 116 is located behind the predetermined pattern, design or other representation 106.

In an embodiment, electronic circuitry 114 is connected to electroluminescent devices 116 through the connector element 126. The sensor 112 is connected to the electroluminescent device 116 via electronic circuitry 114. The electronic circuitry 114 generate and capture signals when one or more conditions are detected by the sensor 112 and transmits the signals to the electroluminescent device 116 to display one or more conditions detected. The electronic circuitry 114 is either wired or wireless. The electroluminescent device 116 are intended to display the signal transmitted by the electronic circuitry in the form of pattern, design or other representation 106 in the laminated curved article 102. The pattern, design or other representation 106 in the laminated curved article 102 may be seen by an observer positioned in front of the glazing 108 or back of the glazing 110. The observer position in front of the glazing 108 is either a passenger or a driver.

Figure 5:
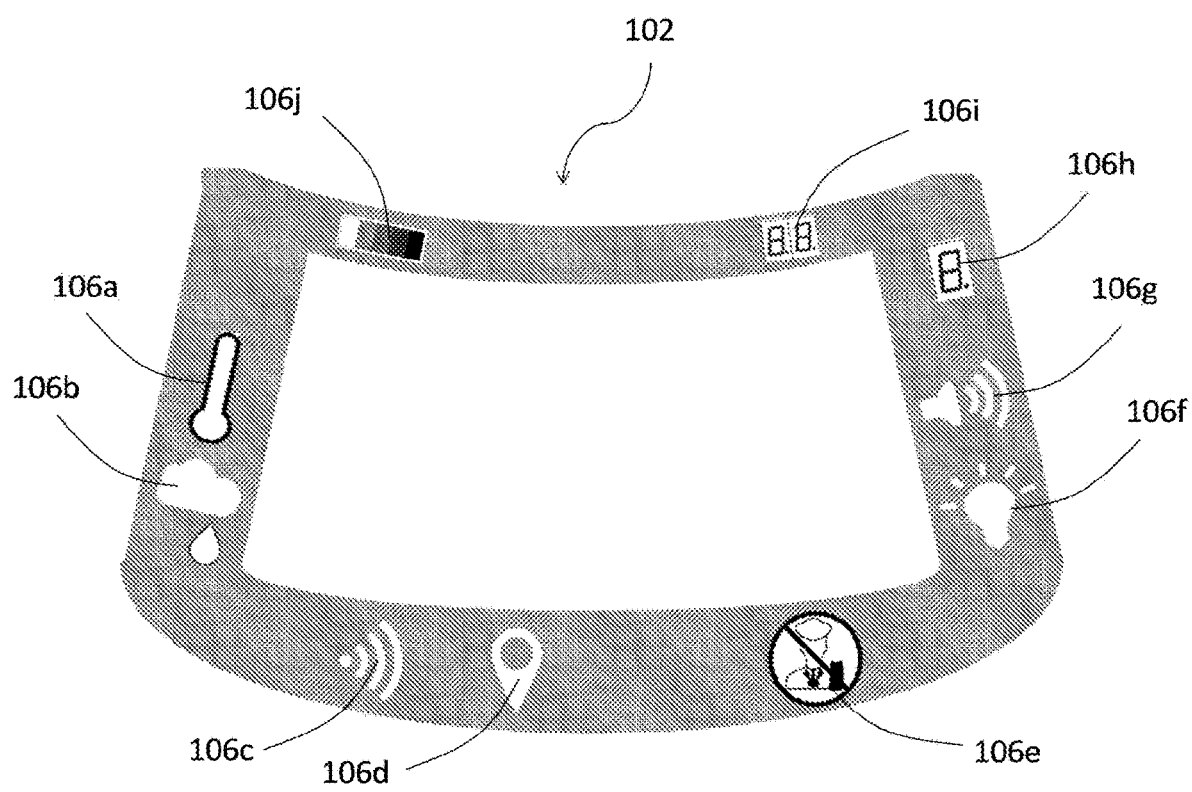
FIG. 5 illustrates a perspective view of a laminated curved article for windshield of a vehicle; according to an embodiment of the present disclosure.

FIG. 5 illustrates a laminated curved article 102 for windshield of a vehicle displaying one or more conditions indicated in the form of pattern, design or other representation 106. The laminated curved article 102 displays pattern, design or other representation 106a to 106j corresponding to the one or more conditions of interest to the driver, passenger or others as well. The one or more sensors 112 (not shown) detect one or more conditions. The one or more sensors 112 (not shown) are specific for the functions to which they are intended: sensors responsive to the environment temperature sensor, relative air humidity sensor, Wi-fi strength, location, breathe analyzer (alcohol testing device), illuminescence sensor, acoustic sensor, sensors for the function of taximeter, occupancy level sensor, air quality sensor and others. The laminated curved article 102 indicates one or more conditions detected by one or more sensors 112 and displayed by one or more electroluminescent devices 116 in the of characters or designs such as temperature 106a, relative humidity 106b, Wi-fi strength 106c, location 106d, alcohol level 106e, illuminance 106f, noise level 106g, taximeter 106h, occupancy number 106i and air quality 106j.

Figure 6:
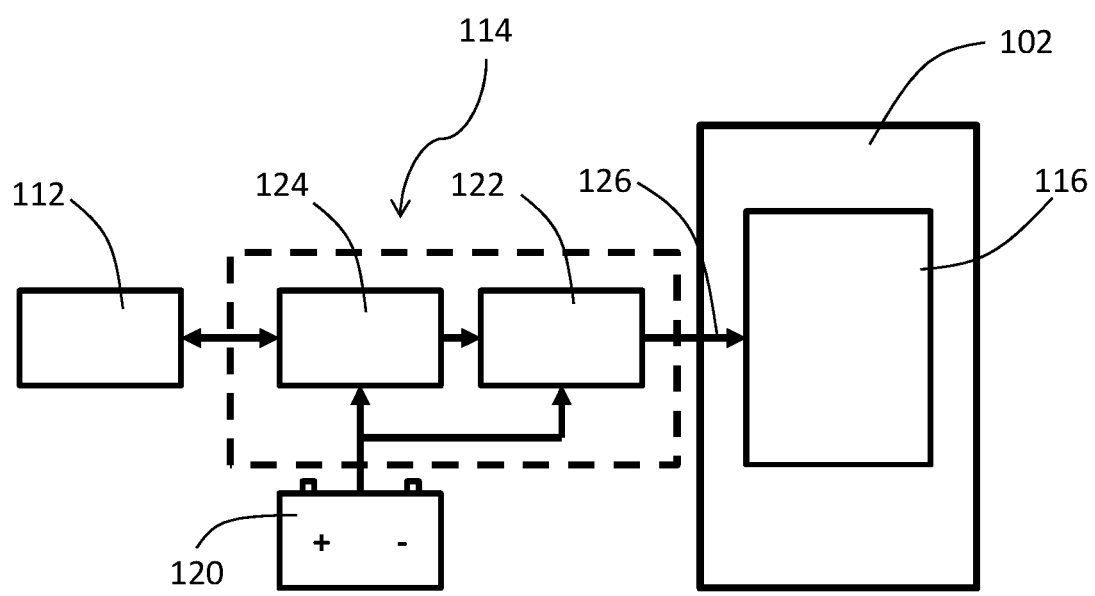
FIG. 6 illustrates a block diagram of the electronic circuitry that connects the electroluminescent devices to the sensors; according to an embodiment of the present disclosure.

FIG. 6 illustrates the electronic circuitry 114 comprising of a controller unit 124, a driver unit 122 and a power unit 120. The controller unit 124 receives and process signal of one or more conditions detected by the sensor 112. The controller unit 124 can also vary the voltage from as high as 120 volts to as low as 20 volts. The driver unit 122 input the signals received from the controller unit 124 into the electroluminescent device 116. The power unit 120 provide power to both the electroluminescent devices 116 and sensor 112. The electronic circuitry 114 connects the sensor 112 to the electroluminescent device 116. Further, the electronic circuitry 114 also powers the sensor 112 and the electroluminescent device 116. The controller unit 124 receives and processes signals from the sensors 112 and transmits them to the driver unit 122 which powers the electroluminescent devices 116 to displays one or more conditions in laminated curved article 102 of the vehicle. The power unit 120 is a battery. In some instances, DC supply is converted to AC output by means of a convertor which is connected to power unit 120. In case of DC type electroluminescent device 116 the need of the convertor can be eliminated and can be directly connected to the power unit 120.

In an embodiment, the electronic circuitry 114 is switched ON/OFF by the vehicle ignition switch. The sensor 112 along with the electronic circuitry 114 may be individually switched ON/OFF by an additional switch placed within the vehicle to reduce the power consumption and based on requirement for real time monitoring. The electronic circuitry 114 is located in any suitable part or mechanism of the vehicle and not limited to the dash board of the vehicle.

In an embodiment, a method to display one or more conditions, comprising of firstly sensing one or more conditions by sensor 112. Secondly, receiving and processing the signals by electronic circuitry 114. Finally, inputting the signals by electronic circuitry 114 to electroluminescent device 116 integrated in the laminated curved article 102.

Figure 7:
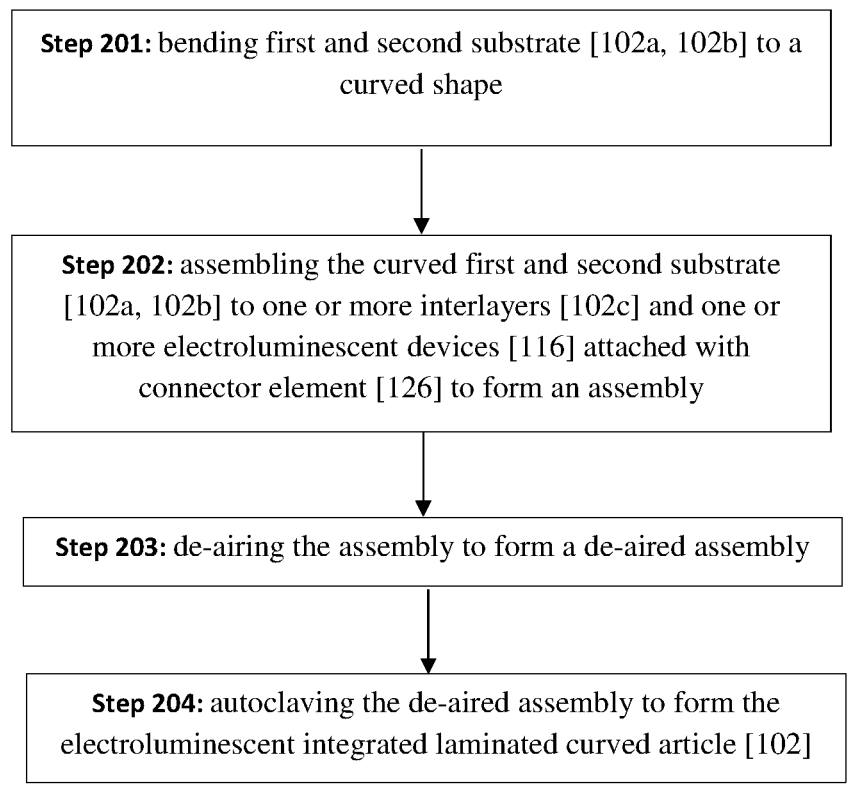
FIG. 7 illustrates a flowchart of the method of manufacturing the laminated curved article; according to an embodiment of the present disclosure.

FIG. 7 illustrates the flowchart for a method of manufacturing an electroluminescent device 116 integrated laminated curved article 102. Step 201 includes bending first and second substrate 102a, 102b to a curved shape. Step 202 includes assembling the curved first and second substrate 102a, 102b to one or more interlayers 102c and one or more electroluminescent devices 116 attached with connector element 126 to form an assembly. Step 203 includes de-airing the assembly to form a de-aired assembly. De-airing is a crucial step in formation of laminated curved article 102. The assembly is kept under vacuum and is heat treated to remove air trapped in between the assembly. During de-airing process the entrapped air between the substrates 102a, 102b, interlayers 102c and electroluminescent device 116 along with connector element 126 is removed to create preliminary adhesion. The de-airing is done by means of having a rubber ring or vacuum rubber bag which seals the complete edges of the assembly. The ring is designed to 95% of the actual assembly circumference and further to accommodate in case the connector element 126 is partially extended portion to avoid leakage of air. The suction takes place by removing the air which is entrapped in between the assembly. The ring has one exit hose through which the air is removed. After the de-airing step the assembly is substantially transparent. If there is cloudiness in the assembly, then it means that air is trapped between the assembly. Alternatively, the interlayer layer 120c is provided with pores (pin holes) for volatiles to escape during the de-airing process. The de-airing is carried out at temperature of at least 90° C. and negative pressure of at least 1 bar for time of at least 30 minutes. Step 204 includes autoclaving the de-aired assembly to form the electroluminescent device 116 integrated laminated curved article 102. The autoclaving process creates the final adhesion of the assembly to form the laminated curved article 102. The autoclaving is carried out at temperature of at least 90° C. and pressure of at least 3 bar for time of at least 30 minutes.

In an embodiment, optionally one or more electroluminescent devices 116 can be first disposed on the first substrate 102a, second substrate 102b or one or more interlayers 102c before bending. In some instances, optionally one or more interlayers 102c can be modified for accommodating one or more electroluminescent devices 116.

INDUSTRIAL APPLICABILITY

In an embodiment, an alcohol detection display system for a vehicle is disclosed. An alcohol display system was installed in a vehicle windshield to provide real time information regarding alcohol consumption by the driver. The alcohol display system was provided with sensors for detecting alcohol concentration using breathe sensor and displaying measured result as alcohol concentration of the driver using one or more electroluminescent devices embedded in the ceramic masking region of the first substrate of the windshield. The electroluminescent devices of different colors were integrated for displaying different levels of alcohol detected. The sensor was calibrated to detect three different levels i.e no alcohol (or 0), alcohol concentration within permissible limits (<0.03%) and alcohol concentration beyond permissible limit (>0.03%). An algorithm was made in order to display three levels of alcohol concentration pertaining to three different electroluminescent device colors. The electroluminescent devices display various levels such as green (for 0), orange (within permissible limits) and red (above permissible limits) as shown in Table 1. The alcohol sensor (breathe sensor) was mounted on the suitable vehicle parts or mechanisms such as vehicle key holder or dashboard. As soon as the driver seated on the vehicle, the alcohol measuring breathe sensor measured the alcohol concentration of the breath. Afterwards, the electronic circuitry captured and converted the alcohol concentration sensed by the sensor into the electronic information and transmit it to the electroluminescent device to display the concentration in the form of colors in the laminated curved article or windshield. From the data provided, it is obvious that the driver got into the car and started from position A with no traces of alcohol. The electroluminescent device displayed green color in the windshield indicating that the driver had no traces of alcohol at position A. The driver stopped at position B and consumed some amount of alcohol. The alcohol sensor detected certain level of alcohol, however it was within permissible level and electroluminescent device displayed orange color in the windshield. After some time, the driver stopped at position C and again consumed some additional amount of alcohol. The breath sensor detected higher levels of alcohol level, which is outside the permissible level. The electroluminescent device displayed red color in the windshield indicating the driver is not suitable to proceed further from position C.

TABLE 1

Electroluminescent device display at different alcohol levels at different positions.

| Position | Electroluminescent device Output (Glow) | | | Alcohol level | Driver State |
|---|---|---|---|---|---|
| | Level 1 | Level 2 | Level 3 | | |
| A | Green | | | Alcohol % = 0 | No traces of alcohol |
| B | Green | Orange | | Alcohol % < 0.03 | Traces of alcohol but permissible |
| C | Green | Orange | Red | Alcohol % > 0.03 | Traces of alcohol, but outside permissible levels |

According to the basic construction described above, the display system 100 and laminated curved article 102 of the present invention may be subject to changes in materials, dimensions, constructive details and/or functional and/or ornamental configuration without departing from the scope of the protection claimed.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Certain features, that are for clarity, described herein in the context of separate embodiments, may also be provided in combination in a single embodiment. Conversely, various features that are, for brevity, described in the context of a single embodiment, may also be provided separately or in a sub combination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

The description in combination with the figures is provided to assist in understanding the teachings disclosed herein, is provided to assist in describing the teachings, and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent that certain details regarding specific materials and processing acts are not described, such details may include conventional approaches, which may be found in reference books and other sources within the manufacturing arts.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

LIST OF ELEMENTS

100 Display system
102 Laminated curved article
102a First substrate
102b Second substrate
102c Interlayer
104 Ceramic masking
106 Pattern
106a Temperature
106b Relative humidity
106c Wi-fi strength
106d Location
106e Alcohol level
106f Illuminance
106g Noise level
106h Taximeter
106i Occupancy number
106j Air quality
108 Observer positioned in front of the glazing
110 Observer positioned on back of the glazing
112 Sensor
114 Electronic circuitry
116 Electroluminescent device
116a Dielectric layer
116b Luminescent layer
116c Conductive layer
116d Insulating layer
116e Protective layer
120 Power unit
122 Driver unit
124 Controller unit
126 Connector element

We claim:

1. A laminated glass for windshield of a vehicle comprising:
a first substrate comprising an outer face and an inner face, and a ceramic mask disposed on the inner face along a periphery of the first substrate, the ceramic mask defining a masked region of the laminated glass;
a plurality of interlayers disposed on the inner face of the first substrate;
a second substrate disposed on the plurality of interlayers; and
one or more electroluminescent devices, each electroluminescent device being:
electrically connected to an electrical connector,
disposed between two or more of the interlayers, and
disposed in the masked region of the laminated glass;
wherein each of the one or more electroluminescent devices is electrically connected to an electronic circuitry through the electrical connector, the electronic circuitry being configured to enable display of luminous indicators and patterns on the windshield by the one or more electroluminescent devices.

2. The laminated glass for windshield of a vehicle as claimed in claim 1, wherein one or both the first substrate and second substrate is a glass or a polymer.

3. The laminated glass for windshield of a vehicle as claimed in claim 2, wherein the polymer is polycarbonate (PC) or polypropylene (PP).

4. The laminated glass for windshield of a vehicle as claimed in claim 1, wherein each of the one or more interlayers comprise a polymer selected from the group consisting of poly vinyl butyral (PVB), polycarbonate, acoustic PVB, ethylene vinyl acetate (EVA), thermoplastic polyurethane (TPU), ionomer, a thermoplastic material, and combinations thereof.

5. The laminated glass for windshield of a vehicle as claimed in claim 1, wherein each of the one or more interlayers has a thickness of at least 0.38 mm.

6. The laminated glass for windshield of a vehicle as claimed in claim 1, wherein one or more of the interlayers is modified by a method selected from the group consisting of cutting, pressing, grinding, heating or combination thereof.

7. The laminated glass for windshield of a vehicle as claimed in claim 1, wherein the one or more electroluminescent devices are optically transparent, opaque or translucent.

8. The laminated glass for windshield of a vehicle as claimed in claim 1, wherein each electroluminescent device and connector is integrated in the laminated glass.

9. The laminated glass for windshield of a vehicle as claimed in claim 1, wherein each electroluminescent device has a thickness of at least 50 µm to 500 µm.

10. The laminated glass for windshield of a vehicle as claimed in claim 1, wherein each electroluminescent device comprises a dielectric layer disposed on a luminescence layer, wherein both the dielectric layer and the luminesce layer are sandwiched by a multilayer consisting of a conductive layer, an insulating layer and a protective layer.

11. The laminated glass for windshield of a vehicle as claimed in claim 10, wherein the protective layer and insulating layer comprises a material selected from the group consisting of polyethylene terephthalate (PET), polyester, polyimide, epoxy resin and polyethylene naphthalate (PEN).

12. The laminated glass for windshield of a vehicle as claimed in claim 10, wherein the conductive layer comprises a material selected from the group consisting of metal, conductive polymers, metal grids, carbon nanotubes (CNT) layer, graphene, transparent conductive oxides and conductive oxides.

13. The laminated glass for windshield of a vehicle as claimed in claim 12, wherein the transparent conductive oxides are selected from the group consisting of zinc oxide and indium tin oxide.

14. The laminated glass for windshield of a vehicle as claimed in claim 12, wherein the conductive polymers are selected from the group consisting of polyaniline and polyindoles.

15. The laminated glass for windshield of a vehicle as claimed in claim 10, wherein the dielectric layer comprises a material selected from the group consisting of silicon dioxide, barium titanate, lead titanate and tin dioxide.

16. The laminated glass for windshield of a vehicle as claimed in claim 10, wherein the luminescence layer comprises a material selected from the group consisting of phosphor, zinc sulphide and cadmium sulphide.

17. The laminated glass for windshield of a vehicle as claimed in claim 10, wherein at least one conductive layer is substantially transparent.

18. The laminated glass for windshield of a vehicle as claimed in claim 10, wherein the conductive layer, dielectric layer and/or luminescence layer is doped.

19. The laminated glass for windshield of a vehicle as claimed in claim 1, wherein an adhesion promoter layer is disposed on one or more electroluminescent devices.

20. The laminated glass for windshield of a vehicle as claimed in claim 1, wherein each connector is sandwiched between a shielding layer.

21. The laminated glass for windshield of a vehicle as claimed in claim 20, wherein the shielding layer comprises a material selected from the group consisting of ethylene propylene rubber, polyimide and cross-linked polyethylene.

22. The laminated glass for windshield of a vehicle as claimed in claim 1, configured to communicate with one or more sensors mounted on the vehicle to receive data therefrom.

23. A display system for displaying data on the windshield of a vehicle comprising:
- a laminated glass;
- one or more electroluminescent devices integrated in the laminated glass; and
- an electronic circuitry comprising a controller unit, a driver unit and a power unit,
- wherein the electronic circuitry is electrically connected to one or more electroluminescent devices through one or more electrical connectors and are configured to receive data from one or more sensors, and wherein the electronic circuitry is configured to control the one or more electroluminescent devices to display the data on the laminated glass.

24. A method of manufacturing a laminated glass comprising:
- a first substrate comprising an outer face and an inner face, and a ceramic mask disposed on the inner face along a periphery of the first substrate, the ceramic mask defining a masked region of the laminated glass;
- a plurality of interlayers disposed on the inner face of the first substrate;
- a second substrate disposed on the plurality of interlayers; and
- one or more electroluminescent devices, each electroluminescent device being:
  - electrically connected to an electrical connector,
  - disposed between two or more of the interlayers, and
  - disposed in the masked region of the laminated glass;
- wherein each of the one or more electroluminescent devices is electrically connected to an electronic circuitry through the electrical connector, the electronic circuitry being configured to enable display of luminous indicators and patterns on the windshield by the one or more electroluminescent devices, the method comprising:
- bending first and second substrate to a curved shape;
- assembling the curved first and second substrate to one or more interlayers and one or more electroluminescent devices attached with connector element to form an assembly;
- de-airing the assembly to form a de-aired assembly; and
- autoclaving the de-aired assembly to form the electroluminescent integrated laminated curved article.

25. The method of manufacturing a laminated glass as claimed in claim 24, comprising disposing one or more electroluminescent devices on the first substrate, second substrate or one or more interlayers before bending.

26. The method of manufacturing a laminated glass as claimed in claim 24, modifying one or more interlayers for accommodating one or more electroluminescent devices.

27. The method of manufacturing a laminated glass as claimed in claim 24, wherein the de-airing is carried out at temperature of at least 90° C. and negative pressure of at least 1 bar for time of at least 30 minutes.

28. The method of manufacturing a laminated glass as claimed in claim 24, wherein the autoclaving is carried out at temperature of at least 90° C. and pressure of at least 3 bar for time of at least 30 minutes.

\* \* \* \* \*